United States Patent
Hayashi et al.

(10) Patent No.: US 7,619,336 B2
(45) Date of Patent: Nov. 17, 2009

(54) VEHICLE-USE GENERATOR WITH REDUCED FAN NOISE

(75) Inventors: Yoshinori Hayashi, Toyohashi (JP); Hiroshi Hamada, Anjo (JP); Mikio Mashino, Kariya (JP); Yoshitaka Kondoh, Oobu (JP)

(73) Assignee: Denso Corporation, Kariya (JP)

( * ) Notice: Subject to any disclaimer, the term of this patent is extended or adjusted under 35 U.S.C. 154(b) by 406 days.

(21) Appl. No.: 11/494,639

(22) Filed: Jul. 28, 2006

(65) Prior Publication Data

US 2007/0024128 A1 Feb. 1, 2007

(30) Foreign Application Priority Data

Aug. 1, 2005 (JP) ............... 2005-222599

(51) Int. Cl.
  *H02K 5/04* (2006.01)
  *H02K 5/00* (2006.01)
  *H02K 9/00* (2006.01)
(52) U.S. Cl. ............... 310/89; 310/58; 310/85
(58) Field of Classification Search ........... 310/58, 310/59, 69 D, 89; *H02K 9/05, 9/06, 5/00, H02K 9/00*
See application file for complete search history.

(56) References Cited

U.S. PATENT DOCUMENTS

| | | | |
|---|---|---|---|
| 5,634,274 A | | 6/1997 | Ohkouchi et al. |
| 5,650,675 A | * | 7/1997 | Kanaya et al. ............ 310/58 |
| 5,696,415 A | * | 12/1997 | Fujimoto et al. ............ 310/89 |
| 6,018,205 A | * | 1/2000 | Ohashi et al. ............ 310/52 |
| 7,057,315 B2 | * | 6/2006 | Ishida et al. ............ 310/59 |
| 2002/0063254 A1 | * | 5/2002 | Tanaka et al. ............ 257/59 |
| 2003/0094865 A1 | * | 5/2003 | Sugitani ............ 310/58 |
| 2005/0093384 A1 | * | 5/2005 | Ishida ............ 310/88 |
| 2007/0138879 A1 | * | 6/2007 | Aoshima ............ 310/58 |

FOREIGN PATENT DOCUMENTS

| | | |
|---|---|---|
| DE | 196 14 580 A1 | 10/1996 |
| EP | 1 032 112 A1 | 8/2000 |
| JP | U 03-021964 | 3/1991 |
| JP | A 07-079543 | 3/1995 |
| JP | A 2000-069714 | 3/2000 |
| WO | WO 2005/062444 A1 | 7/2005 |

OTHER PUBLICATIONS

European Search Report issued Nov. 30, 2007.

* cited by examiner

*Primary Examiner*—Quyen Leung
*Assistant Examiner*—Michael Andrews
(74) *Attorney, Agent, or Firm*—Oliff & Berridge, PLC

(57) ABSTRACT

The vehicle-use generator driven by a vehicle engine at a rotating shaft thereof includes a rotor rotatably mounted to the rotating shaft, a stator fixedly located radially outward of the rotor, a cooling fan fixed to the rotor to rotate together with the rotating shaft in order to generate cooling air for cooling the stator, and a housing that houses the rotor and the stator and rotatably supports the rotating shaft. The housing is provided with ribs arranged in a circumferential direction of the rotating shaft so as to form cooling air outlet windows. The ribs are inclined with respect to a radial direction of the rotating shaft, and shaped such that widths of the ribs are gradually changed cyclically in the circumferential direction.

6 Claims, 6 Drawing Sheets

-- PRIOR ART --

-- PRIOR ART --

VEHICLE-USE GENERATOR WITH REDUCED FAN NOISE

CROSS-REFERENCE TO RELATED APPLICATION

This application is related to Japanese Patent Application No. 2005-222599 filed on Aug. 1, 2005, the contents of which are hereby incorporated by reference.

BACKGROUND OF THE INVENTION

1. Field of the Invention

The present invention relates to a vehicle-use generator for a vehicle such as a passenger car or a truck 2. Description of Related Art Recently, the engine noise of a vehicle such as a passenger car or a truck is steadily reduced to meet the social demand for the reduction of vehicle noise, and also to increase merchantability of the vehicle. However, reducing the engine noise tends to make the noises of auxiliaries rotating at relatively high speeds which are mounted on the same vehicle, especially a vehicle-use generator, more harsh and conspicuous.

There have been proposed various techniques for reducing the noise of a vehicle-use generator, while improving the self-cooling capability of the vehicle-use generator by making changes to the shape around cooling air outlet windows formed in a housing of the generator. For example, Japanese Patent Application Laid-open No. 2000-69714 discloses smoothing a cooling air flow by streamlining ribs made so as to form cooling air outlet windows, to thereby reduce the drag force of the cooling air flow. Japanese Patent Application Laid-open No. 7-79543 discloses reducing the drag force of a cooling air flow by elaborating on the inclination of ribs around support members of a housing of a vehicle-use generator.

However, the structures disclosed in the above described patent documents have a problem in that the fan noise of the vehicle-use generator is not reduced much, because the reduction of the drag force of the cooling air flow around the ribs or the support members of the housing causes the cooling air flow to increase that much. Moreover, although the fan noise may contain a specific order component which is harsh to hear depending on a distance between adjacent ribs or adjacent cooling air outlet windows when they are evenly spaced in a circumferential direction, no consideration on this is given in these documents.

SUMMARY OF THE INVENTION

The present invention provides a vehicle-use generator driven by a vehicle engine at a rotating shaft thereof, including:

a rotor rotatably mounted to said rotating shaft;

a stator fixedly located radially outward of the rotor;

a cooling fan fixed to the rotor to rotate together with the rotating shaft in order to generate cooling air for cooling the stator; and a housing that houses the rotor and the stator and rotatably supports the rotating shaft, the housing being provided with a plurality of ribs arranged in a circumferential direction of the rotating shaft so as to form a plurality of cooling air outlet windows;

wherein the plurality of ribs are inclined with respect to a radial direction of the rotating shaft, and shaped such that widths of the ribs are gradually changed cyclically in the circumferential direction.

According to the present invention in which the ribs are inclined with respect to the radial direction of the rotating shaft, and shaped such that widths of the ribs are gradually changed cyclically in the circumferential direction, the total fan noise as well as its harsh component, which is produced in the vicinity of the ribs, can be sufficiently suppressed.

Other advantages and features of the invention will become apparent from the following description including the drawings and claims.

PREFERRED EMBODIMENTS OF THE INVENTION

Figure 1:
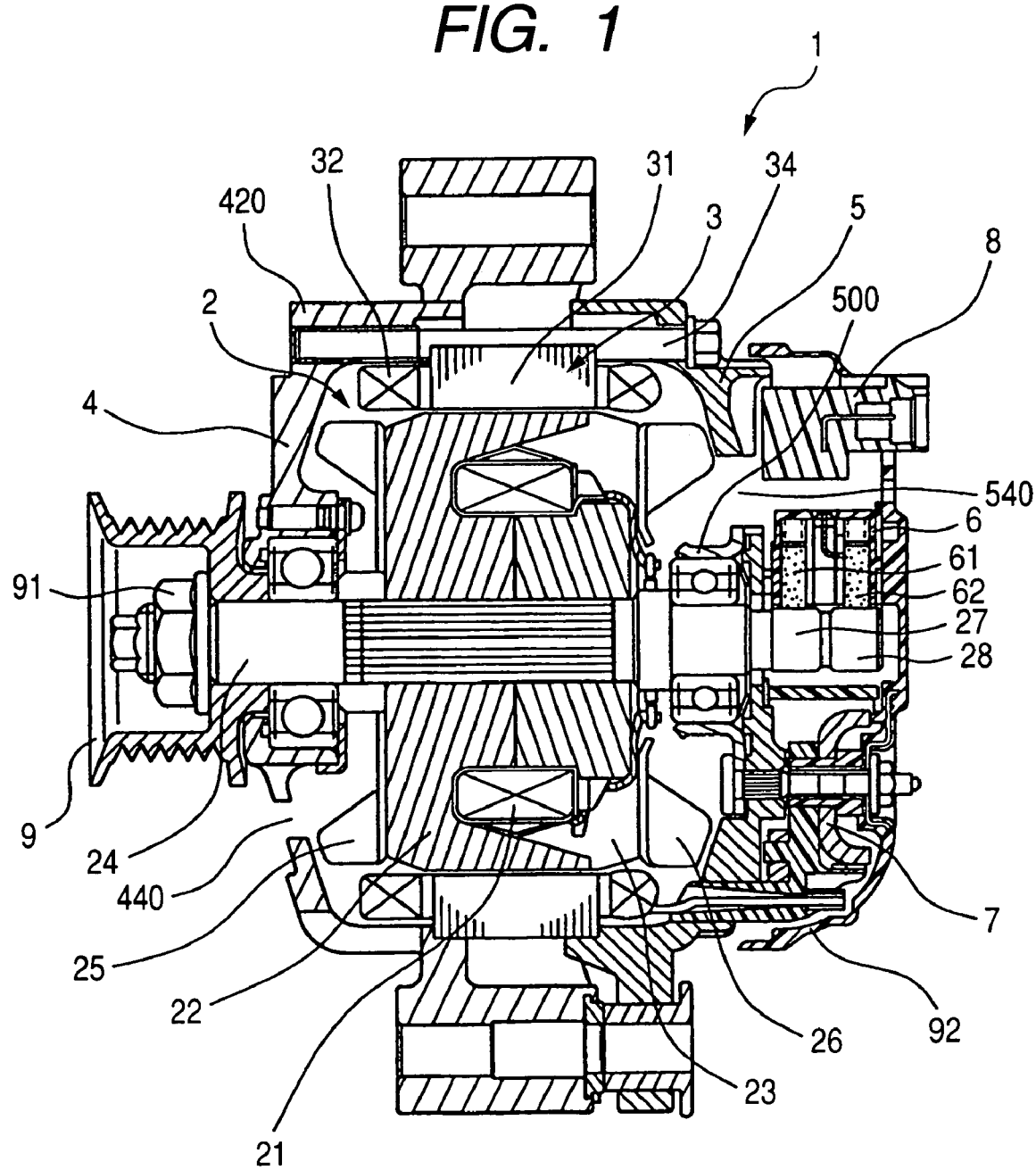
FIG. 1 is a cross-sectional view of a vehicle-use generator according to an embodiment of the invention.

FIG. 1 is a cross-sectional view of a vehicle-use generator 1 according to an embodiment of the invention. The vehicle-use generator 1 includes a rotor 2, a stator 3, a front-side housing 4, a rear-side housing 5, a brush device 6, a rectifier 7, a voltage regulator 8, and a pulley 9.

The rotor 2 has such a structure that a field winding 21 formed by a copper wire wound in a cylindrical shape is put between a front-side field core 22 and a rear-side field core 23, each of which is fixed to a rotating shaft 24 and includes six claw portions. A cooling fan 25, which may be of the axial type, or a mix of the axial type and the centrifugal type, is fixed by welding to a front-side (pulley 9 side) end surface of the field core 22 in order to suck in cooling air from the front side, and blow it out in the axial direction and the radial direction. Likewise, a centrifugal type cooling fan 26 is fixed by welding to a rear-side end surface of the field core 23 in order to suck in cooling air from the rear side, and blow it out in the radial direction.

The rotating shaft 24 is provided, at its rear end, with slip rings 27, 28 electrically connected to the field winding 21. The brush device 6 is installed in such a state that brush members 61, 62 thereof are in slide contact with the slip rings 27, 28, respectively, so that an excitation current flows from the rectifier 7 to the field coil 21.

The stator 3 includes a stator core 31 formed with a plurality of slots therein, and a three-phase stator winding 32 wound in the slots. The rectifier 7, which is for full-wave rectifying of a three-phase AC voltage induced in the three-phase stator winding 32 of the stator 3 to generate a DC output voltage, includes a positive-terminal-side radiator plate, a negative-terminal-side radiator plate, and rectifying devices mounted by soldering to these radiator plates.

The front-side housing 4 and the rear-side housing 5 house the rotor 2 and the stator 3. The rotor 2 is rotatably supported by the rotating shaft 24, while the stator 3 is fixedly located outwardly of the field cores 22, 23 to form a certain circumferential gap with these field cores. The stator 3 is secured to four evenly circumferentially spaced support members 420 by through bolts 34.

The voltage regulator 8 regulates the output voltage of the generator 1 at substantially a constant value by controlling the excitation current flowing into the field winding 21 depending on the amount of electric load and the amount of power generation. The pulley 9, which is for transmitting the torque of an engine (not shown) to the rotor 2, is secured to the front-side end of the rotating shaft 24 by a nut 91. A rear cover 92 is fitted to the rear-side housing 5 to protect the brush device 6, rectifier 7, and voltage regulator 8.

When the torque is applied from the engine to the pulley 9 through a belt, the rotor 2 starts rotating. In this state, by supplying the excitation current to the field winding 21 to excite the claw portions of the field cores 22, 23, a three-phase AC voltage is induced in the stator winding 32, as a result of which the rectifier 7 outputs a DC current from its output terminal.

Since the cooling fan 25 fixed to the end surface of the field core 22 rotates with the rotation of the rotor 2, cooling air is sucked into the generator 1 from inlet holes 440 formed in the front-side housing 4 when the rotor 2 rotates. The field winding 21 is cooled by the axial component of the flow of this cooling air, and the front-side coil end of the stator winding 21 is cooled by the radial component of the flow of this cooling air.

Likewise, since the cooling fan 26 fixed to the end surface of the field core 23 rotates with the rotation of the rotor 2, cooling air is sucked into the generator 1 from intake holes formed in the rear cover 92. This cooling air cools the rectifier 7 and the voltage regulator 8, and then is led to the cooling fan 26 through intake passages 540 in the rear-side housing 5 to be radially diffused, so that the rear-side coil end of the stator winding 32 is cooled.

Figure 2:
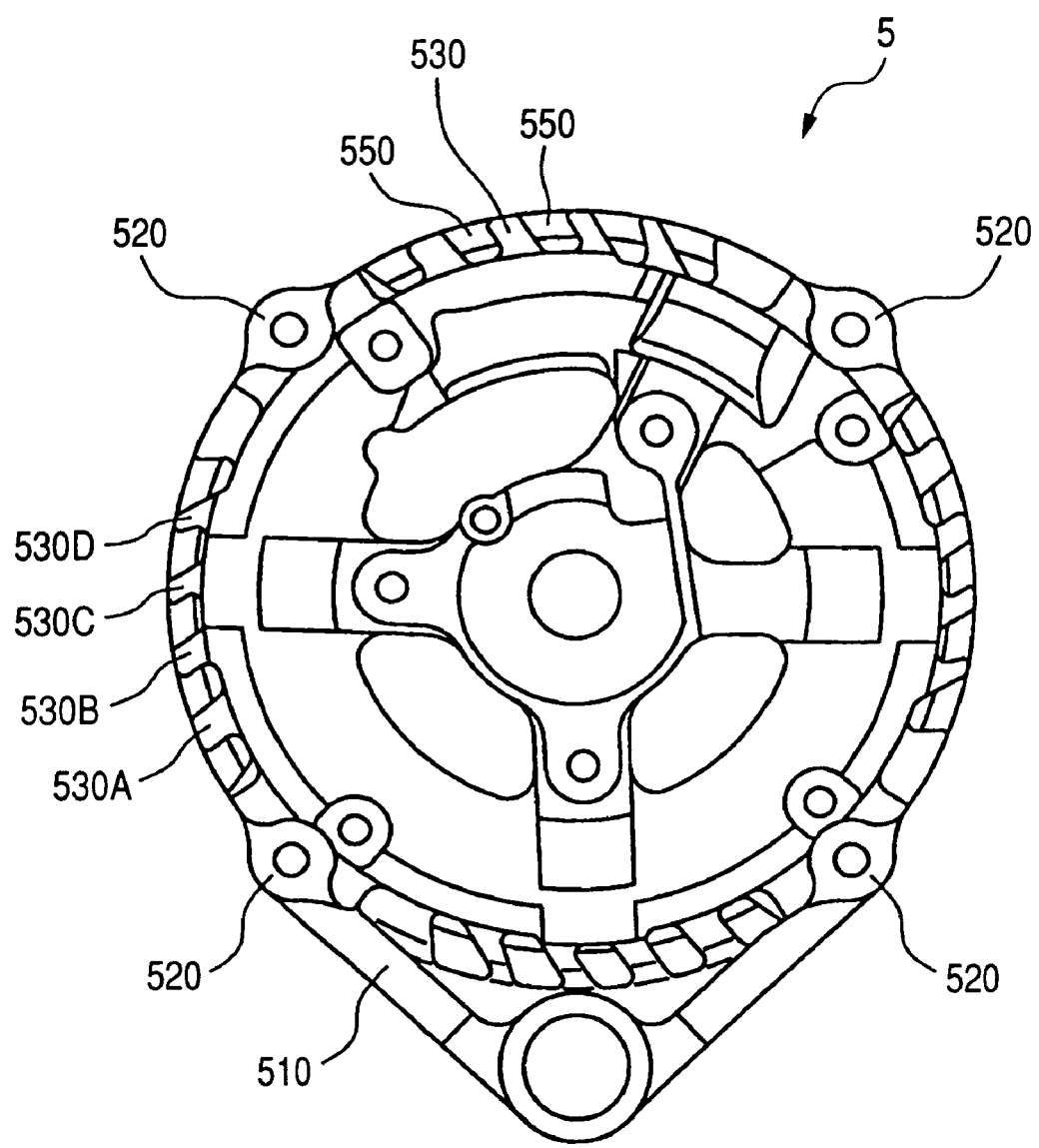
FIG. 2 is a plan view of a rear-side housing of the vehicle-use generator according to the embodiment of the invention.

FIG. 2 is plan view of the rear-side housing 5. As shown in FIG. 1 and FIG. 2, the rear-side housing 5 includes a bearing housing member 500 (FIG. 1 only) facing the rear-side end surface of the rotor 2 and housing a rear-side bearing, a stay 510 for installation of the generator 1 to an engine block (not shown), and four support members 520 which are circumferentially evenly spaced. Two of the four support members 520 are located near root portions of the stay 510. Each of the support members 520 has a bolt housing portion. The stator 3 is installed by inserting the through bolts 34 into the bolt housing portions of the support member 520 with a front part of the stator 3 being put in the front-side housing 4, and tightening the through bolts 34.

The rear-side housing 5 is provided with a plurality of ribs 530 circumferentially arranged between the supporting members 520 so as to form a plurality of cooling air outlet windows 550 through which the cooling air diffused by the cooling fan 26 is blown out. As shown in FIG. 2, the ribs 530 are inclined towards the downstream side with respect to the rotational direction of the rotor 2, and the inclination angle of the ribs 530 increase towards the radially outward direction. In addition, the ribs 530 are so shaped that the rib width gradually increases in the direction from the upstream side to the downstream side with respect to the rotational direction of the rotor 2 between the adjacent support members 520. As shown in FIG. 2, when the four ribs 530 located between the adjacent support members 520 are designated as 530D, 530C, 530B, 530A in the direction from the upstream side to the downstream side with respect to the rotational direction of the rotor 2, their widths 530DW, 530CW, 530BW, 530AW satisfy the relationship of 530AW>530BW>530CW>530DW. In this embodiment, the cooling air outlet windows 550 each of which is formed by the two adjacent ribs 530, and the cooling air outlet windows 550 each of which is formed by the rib 530 adjacent to the support members 520 and the circumferential wall continuing to this support member 520 have the same width.

Figure 3:
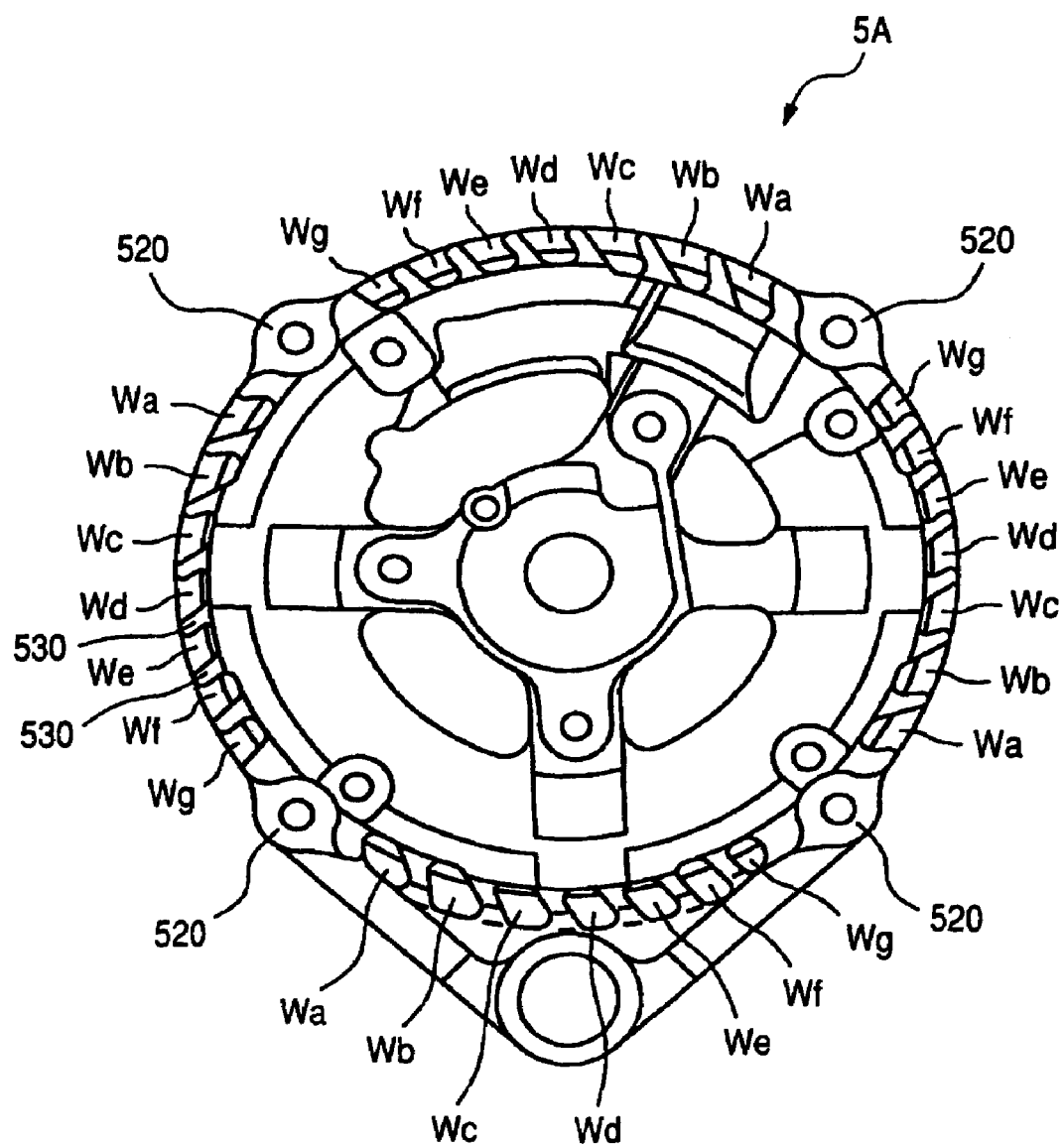
FIG. 3 is a plan view of a conventional rear-side housing of a vehicle-use generator.

In a conventional rear-side housing 5A in which all the ribs 530 have the same width as shown in FIG. 3, this same width may be set to a minimum value ensuring a necessary strength. In this embodiment, since the smallest of the widths of the ribs 530 must have at least the minimum value ensuring the necessary strength, and accordingly the others must have values larger than this minimum value, the number of the cooling air outlet windows that can be formed is small compared to the conventional case where all the ribs have the same width. It can be seen from FIG. 3 and FIG. 2 that the number of the cooling air outlet windows 550 formed between the two adjacent support members 520 is seven in the conventional rear-side housing 5A, while it is five in the rear-side housing 5 of this embodiment.

Figure 4:
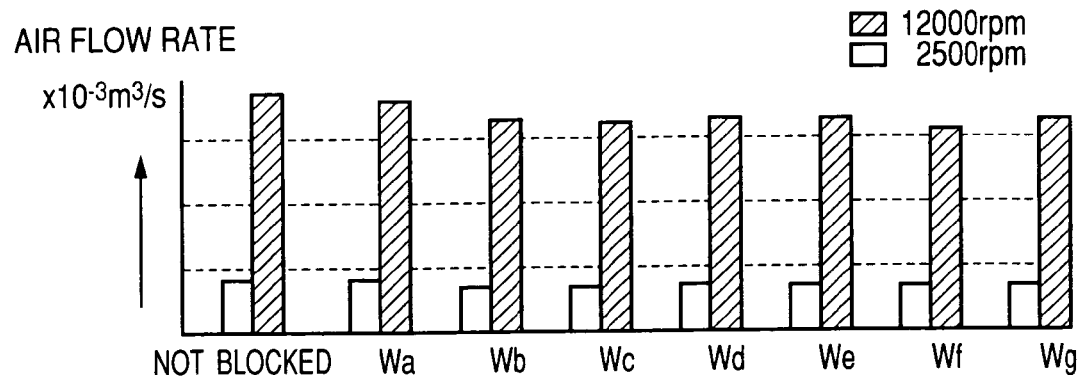
FIG. 4 is a graph showing measurement results of the total amount of cooling air blown out from the generator per second when cooling air outlet windows located at specific circumferential positions in the conventional rear-side housing are blocked.

FIG. 4 is a graph showing measurement results of the total amount of the cooling air blown out from the generator 1 when the cooling air outlet window located at each specific circumferential position in the conventional rear-side housing 5A shown in FIG. 3 is blocked. Here, as shown in FIG. 3, the seven cooling air outlet windows located between the adjacent support members 520 are designated as Wa, Wb, Wc, Wd, We, Wf, and Wg in the direction from the upstream side to the downstream side with respect to the rotational direction of the rotor 2. The graph of FIG. 4 shows that not all the seven cooling air outlet windows Wa to Wg located between the adjacent support members 520 make a substantial contribution to the cooling performance. More specifically, the total amount of the cooling air outlet from the generator 1 per second is reduced very little when the cooling air outlet window Wa which is in the most upstream position between the adjacent support members 520 is blocked. Accordingly, in this embodiment, the five cooling air outlet windows located between the adjacent support members 520 are slightly clustered towards the downstream side with respect to the rotational direction of the rotor 2, so that the reduction of the cooling air flow due to the reduction of the number of the cooling air outlet windows can be minimized.

Figure 5:
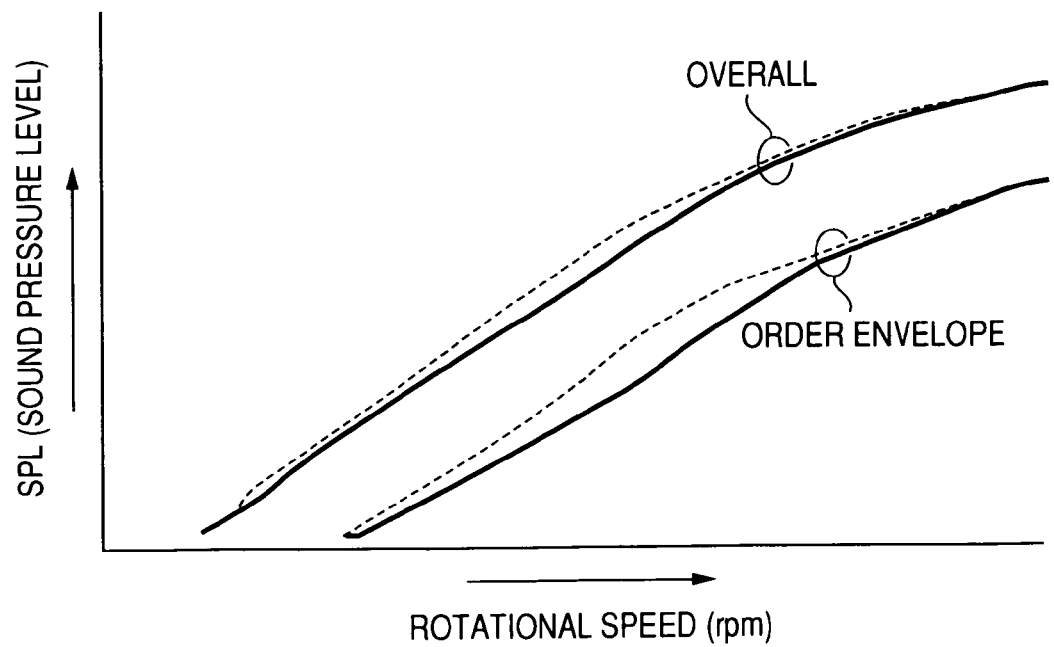
FIG. 5 is a graph showing measurement results of the fan noise of the generator according to the embodiment of the invention as a function of the rotational speed of the generator.

FIG. 5 is a graph showing measurement results of the fan noise of the generator 1 of this embodiment as a function of the rotational speed of the generator 1. In the graph of FIG. 5, the horizontal axis represents the rotational speed (rpm) of the generator 1, and the vertical axis represents the sound pressure level (SPL). The measurement was performed for "overall" representing summed components of all orders, and "order envelope" representing an envelope of the peaks of these components. The solid curves in the graph show a case of the rear-side housing 5 shown in FIG. 2 where the rib width gradually increases in the direction from the upstream side to the downstream side between the adjacent support members 520. On the other hand, the dotted curves show a case of the conventional rear-side housing 5A shown in FIG. 3 where the rib width is constant although the ribs are inclined towards the downstream side.

It can be seen from FIG. 5 that using the rear-side housing 5 shown in FIG. 2 makes it possible to reduce the fan noise of the generator 1 for both the "overall" and "order envelope". In particular, it has been confirmed that the fan noise can be greatly reduced in a range of 8,000-11,000 rpm.

Figure 6:
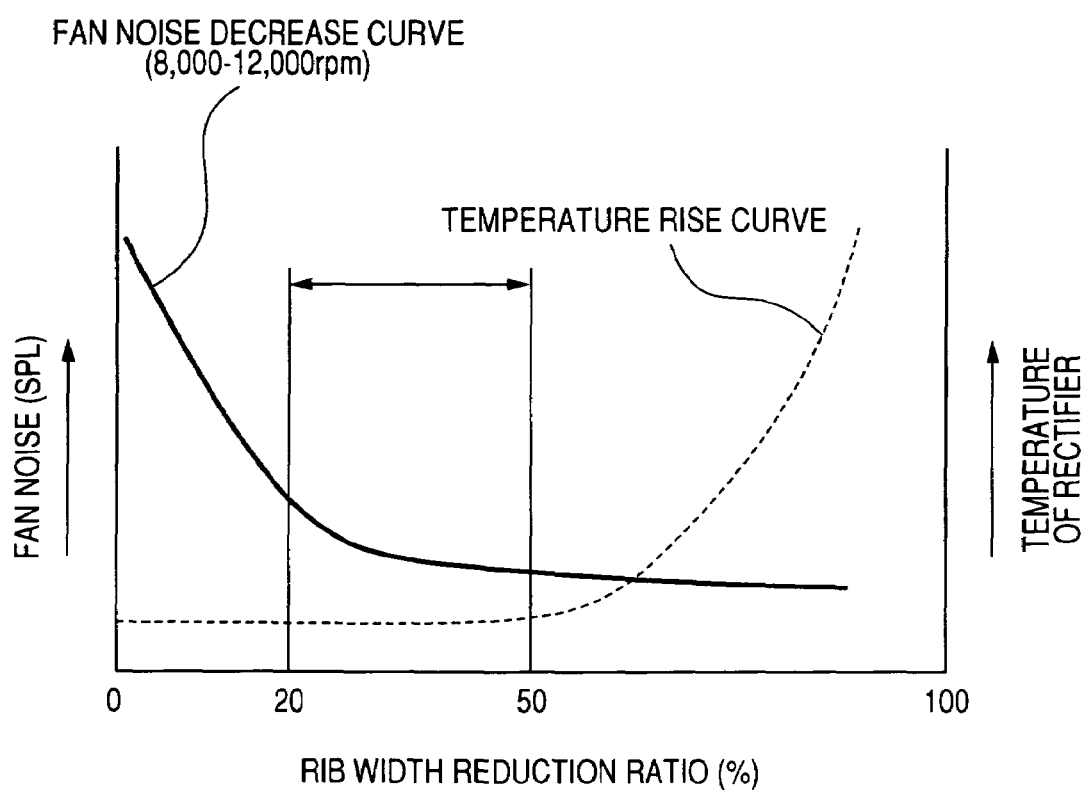
FIG. 6 is a graph showing measurement results of the fan noise and the temperature of a rectifier of the generator according to the embodiment of the invention as functions of a rib width reduction ratio.

FIG. 6 is a graph showing measurement results of the sound pressure level (the solid curve) of the fan noise of the generator 1, and the temperature (the dotted curve) of the rectifier 7 as functions of a rib width reduction ratio. In this graph, the horizontal axis represents the rib width reduction ratio which means to what extent the width of the narrowest rib 530D has been reduced with respect to the width of the widest rib 530A ($1-530D_W/530A_W \times 100(\%)$), the left vertical axis represents the sound power level (SPL), and the right vertical axis represents the temperature.

It can be seen from the graph of FIG. 6 that the fan noise decreases with the increase of the rib width reduction ratio, and the decreasing rate of the fan noise becomes low when the rib width reduction ratio exceeds 20%. It has been confirmed that when the rib width reduction ratio is larger than 20%, the sound power level of the fan noise is reduced by 3 dB for "over all", and by 2 to 4 dB for "order envelope". From this graph, it can be also seen that the temperature of the rectifier 7 is substantially constant before the rib width reduction ratio reaches 50%, however, it starts to rise rapidly with the increase of the rib width reduction ratio when the rib width reduction ratio exceeds 50%.

Actually, the rib width reduction ratio cannot be set very large, because if the rib width reduction ratio is too large, it becomes difficult for at least the narrowest rib to have a sufficient strength. And, since the total area of the cooling air outlet windows decreases with the increase of the rib width reduction ratio, it is preferable that the rib width reduction ratio is set between 20% and 50% in order to obtain a sufficient fan noise reduction effect, while suppressing the temperature rise of the rectifier 7.

As explained above, unlike conventional generators in which all the ribs have the same width, the generator 1 of this embodiment has such a structure that the rib width gradually increases between the adjacent support members 520 in the direction from the upstream side to the downstream side with respect to the rotational direction of the rotor 2. According to this structure, although the total area of the cooling air outlet windows 550 formed by the ribs 530 is reduced, the total fan noise as well as its harsh component, which is produced in the vicinity of the ribs 530, can be suppressed without increasing the temperature of the rectifier 7, because the reduction of the total cooling air flow can be minimized.

In addition, since the cooling air outlet windows 550 have the same width in the circumferential direction, the cooling air flow blown out through these windows have roughly a uniform pressure, and accordingly disturbance of the cooling air flow is small. This makes it possible to minimize cooling performance reduction, and a fan noise newly caused by the disturbance of the cooling air flow.

It should be noted that the gradual increase of the rib width in the direction from the upstream side to the downstream side with respect to the rotational direction of the rotor 2 makes it possible to reduce the component of a specific order contained in the fan noise.

The gradual increase of the rib width also makes it possible to improve the capability of cooling the rectifier 7, because the amount of heat transferring from the rectifier 7 to the rear-side housing 5 can be increased compared to the conventional structure in which all the ribs have the same width.

When the ratio of the width of the narrowest rib to the width of the widest rib is set between 0.8 and 0.5, it is possible to obtain both the improvement in the fan noise reduction and the improvement in the temperature reduction of the rectifier 7. It has been confirmed through experiment that when the rib width reduction ratio is set between 35% and 40%, that is, when the ratio of the width of the narrowest rib to the width of the widest rib is set between 0.65 and 0.6, the fan noise can be sufficiently reduced while suppressing the temperature rise of the rectifier 7.

It is a matter of course that various modifications can be made to the above described embodiment as described below.

The above described structure that the rib width is gradually increased may be applied to the ribs and the cooling air outlet windows of not the rear-side housing 5 but the front-side housing 4, or may be applied to the both of them.

In contrast to the above described embodiment, the rib width may be gradually reduced in the direction from the upstream side to the downstream side with respect to the rotational direction of the rotor 2. Also in this case, it is possible to reduce the component of a specific order contained in the fan noise, while minimizing the reduction of the total cooling air flow.

Figure 7:
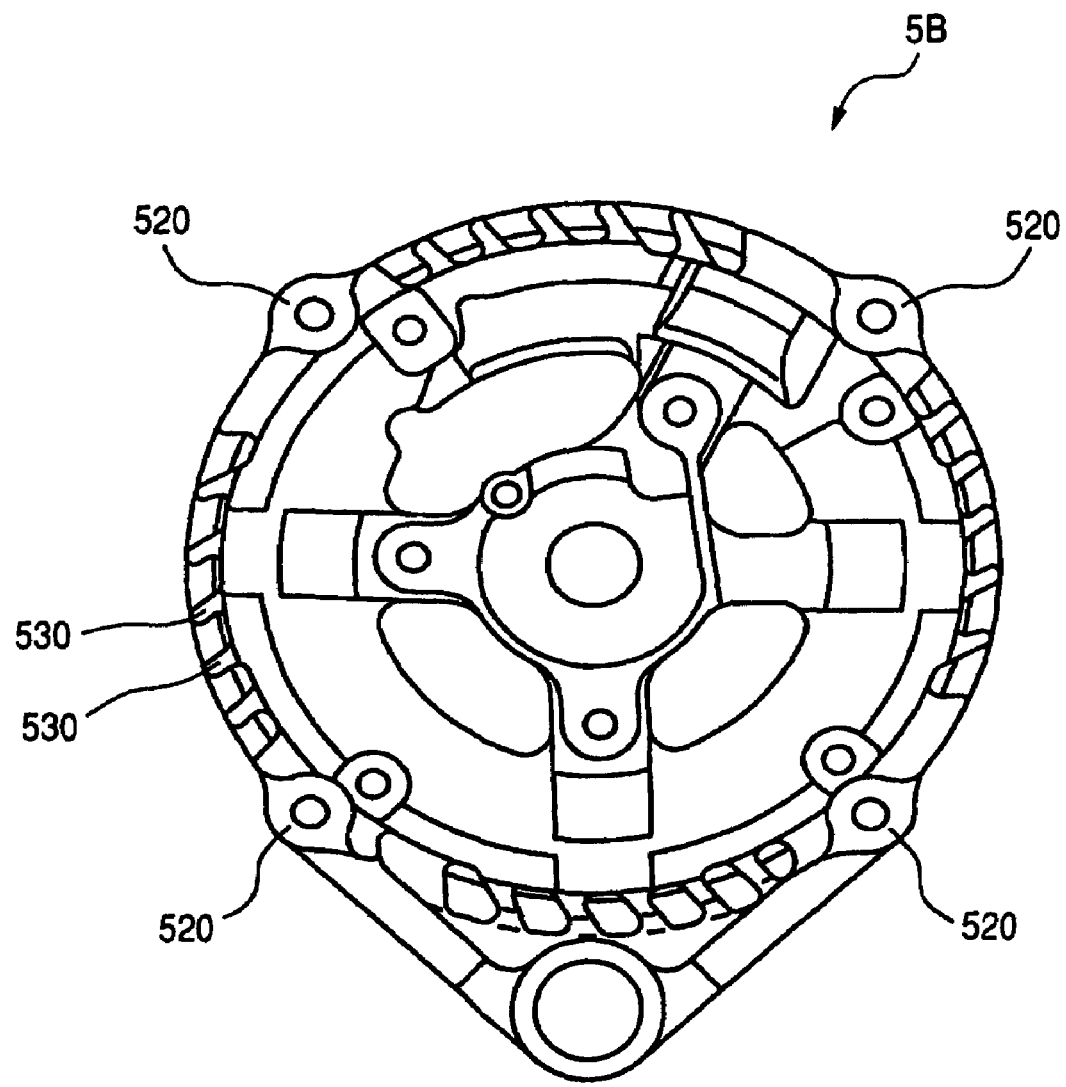
FIG. 7 is a plan view of a rear-side housing as a variant of the rear-side housing shown in FIG. 3.

Of the cooling air outlet windows located between the adjacent support members 520, the one which makes very little contribution to the cooling performance (the one located in the most upstream position) may be blocked if the temperature rise of the rectifier 7 is within an allowable range. FIG. 7 shows a rear-side housing 5B which is a variant of the rear-side housing 5A shown in FIG. 3. The rear-side housing 5B is the same as the rear-side housing 5A except that, of the cooling air outlet windows located between the adjacent support members 520, the one located in the most upstream position (the cooling air outlet window Wa) is blocked. In the rear-side housing 5B, since the rib width is not gradually increased or reduced between the adjacent support members 520, the pressure fluctuation of the cooling air flow cannot be suppressed, however, the overall value of the fan noise can be reduced, because the total area of the cooling air outlet windows is reduced. Since the rear-side housing 5B can be manufactured by modifying a previously used mold, this rear-side housing 5B makes it possible to reduce the fan noise without incurring high costs.

The above explained preferred embodiments are exemplary of the invention of the present application which is described solely by the claims appended below. It should be understood that modifications of the preferred embodiments may be made as would occur to one of skill in the art.

What is claimed is:

1. A vehicle-use generator driven by a vehicle engine at a rotating shaft thereof, comprising:

a rotor rotatably mounted to the rotating shaft;

a stator fixedly located radially outward of the rotor;

a cooling fan fixed to the rotor to rotate together with the rotating shaft in order to generate cooling air for cooling said stator; and a housing that houses the rotor and the stator and rotatable supports said rotating shaft, the housing being provided with a plurality of ribs arranged in a circumferential direction of the rotating shaft so as to form a plurality of cooling air outlet windows;

wherein the plurality of ribs are inclined with respect to a radial direction of the rotating shaft in a plane perpendicular to an axial direction of the rotating shaft, wherein the radial direction is a line extending from a center of the rotating shaft to a center of one rib of the plurality of ribs, and shaped such that widths of the ribs of the plurality of ribs are gradually changed cyclically in the circumferential direction, and wherein a ratio of a width of the narrowest one of the plurality of the ribs to a width of a widest one of the plurality of ribs is between 0.8 and 0.5.

2. The vehicle-use generator according to claim 1, wherein the plurality of the cooling air outlet windows, each of which is formed by adjacent two of the plurality of said ribs, have the same width in the circumferential direction.

3. The vehicle-use generator according to claim 1, wherein the widths of the ribs of the plurality of ribs are gradually increased cyclically in a direction from an upstream side to a downstream side with respect to a rotational direction of the rotor.

4. The vehicle-use generator according to claim 1, wherein the widths of the ribs of the plurality of ribs are gradually reduced cyclically in a direction from an upstream side to a downstream side with respect to a rotational direction of the rotor.

5. The vehicle-use generator according to claim 1, wherein the housing is constituted by a front-side housing and a rear-side housing, a rectifier for rectifying an AC voltage induced in a stator winding of the stator being mounted to the rear-side housing, the plurality of ribs being formed in the rear-side housing.

6. A vehicle-use generator driven by a vehicle engine at a rotating shaft thereof, comprising:

a rotor rotatably mounted to the rotating shaft;
a stator fixedly located radially outward of the rotor;
a cooling fan fixed to the rotor to rotate together with the rotating shaft in order to generate cooling air for cooling said stator; and
a housing that houses the rotor and the stator and rotatably supports said rotating shaft, the housing being provided with a plurality of ribs arranged in a circumferential direction of the rotating shaft so as to form a plurality of cooling air outlet windows;
wherein the plurality of ribs are inclined with respect to a radial direction of the rotating shaft in a plane perpendicular to an axial direction of the rotating shaft, wherein the radial direction is a line extending from a center of the rotating shaft to a center of one rib of the plurality of ribs, and shaped such that widths of the ribs of the plurality of ribs are gradually changed cyclically in the circumferential direction, and
wherein the housing has a plurality of support members that are evenly spaced in the circumferential direction for supporting the stator, the plurality of ribs being clustered towards a downstream side with respect to a rotational direction of the rotor between an adjacent two support members of the plurality of support members.

* * * * *